(12) United States Patent
Benazouzz et al.

(10) Patent No.: US 6,884,856 B2
(45) Date of Patent: Apr. 26, 2005

(54) POLYMERIZATION CONTROL PROCESS

(75) Inventors: Gacem Benazouzz, Edinburgh (GB); Claire Couronne, Martigues (FR); Sebastien Huchette, Martigues (FR); Patrick Leaney, Bouc Bel Air (FR); Christel Maire-Claude Mealares, Martigues (FR); Frederic Robert Marie Michel Morterol, Sausset-les-Pins (FR); Renaud Viguier, Sete (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/483,896

(22) PCT Filed: Jul. 15, 2002

(86) PCT No.: PCT/GB02/03206

§ 371 (c)(1),
(2), (4) Date: Jan. 15, 2004

(87) PCT Pub. No.: WO03/008469

PCT Pub. Date: Jan. 30, 2003

(65) Prior Publication Data

US 2004/0186249 A1 Sep. 23, 2004

(30) Foreign Application Priority Data

Jul. 17, 2001 (EP) .............................................. 01430020

(51) Int. Cl.$^7$ .................................................. C08F 2/34

(52) U.S. Cl. .......................... 526/68; 526/351; 526/352; 526/901; 526/348

(58) Field of Search ......................... 526/68, 348, 351, 526/352, 901

(56) References Cited

FOREIGN PATENT DOCUMENTS

| EP | 0 770 629 A2 | | 5/1997 | |
|----|----|----|----|----|
| EP | 770629 A2 | * | 5/1997 | ............ C08F/10/02 |
| WO | WO 00/32651 | * | 6/2000 | ............ C08F/10/00 |

* cited by examiner

Primary Examiner—William K. Cheung
(74) Attorney, Agent, or Firm—Finnegan, Henderson, Farabow, Garrett and Dunner, L.L.P.

(57) ABSTRACT

The present invention relates to a continuous process for controlling the gas-phase co-polymerisation of olefins in a fluidised bed reactor. The present invention further relates to a method for the continuous gas-phase (co-)polymerisation of olefins in a fluidised bed reactor in the presence of a polymerisation catalyst wherein the density of the polymer powder particles leaving the reactor is maintained constant by controlling the particle size distribution of the polymerisation catalyst. The present invention also relates to a process for controlling the particle size distribution of a polymerisation catalyst in order to achieve the production of a polymer powder of constant density during the continuous gas-phase (co-)polymerisation of olefins in a fluidised bed reactor.

11 Claims, No Drawings

POLYMERIZATION CONTROL PROCESS

The present invention relates to a continuous process for controlling the gas-phase co-polymerisation of olefins in a fluidised bed reactor. The present invention further relates to a method for the continuous gas-phase (co-)polymerisation of olefins in a fluidised bed reactor in the presence of a polymerisation catalyst wherein the density of the polymer powder particles leaving the reactor is maintained constant by controlling the particle size distribution of the polymerisation catalyst. The present invention also relates to a process for controlling the particle size distribution of a polymerisation catalyst in order to achieve the production of a polymer powder of constant density during the continuous gas-phase (co-)polymerisation of olefins in a fluidised bed reactor.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

A gas fluidised bed polymerisation reactor is typically controlled to achieve a desired melt index and density for the polymer at an optimum production and temperature.

The Applicants have now found that the use of more stringent process operating conditions or new polymerisation catalyst systems may cause problems to the density control of the polymer produced, particularly for high space time yield polymerisation processes. The Applicants believe that controlling the particle size distribution of the polymerisation catalyst can successfully solve this problem of density control.

Although it is known that a fluidised bed ensures good solids mixing and good heat transfer, it has been found that control of particle size distribution of polymerisation catalyst is key to the obtaining of uniform product properties, especially of the density of the polymer.

The polymer sintering temperature varies with the polymer properties and is particularly sensitive to density. It has been found that the improvement provided by this invention in the control of the polymer density instantaneously produced at any point within the polymerisation zone is particularly significant in avoiding the occurrence of off-specification materials.

Thus, according to the present invention, there is provided a process for controlling a continuous fluidised bed reactor (co-)polymerisation process which comprises:

1. withdrawing from the reactor a hot recycle stream comprising a principal monomer and at least another unreacted reactant,
2. cooling part or all of said recycle stream withdrawn from said reactor, and
3. recycling part or all of said cooled recycle stream comprising the principal monomer and the unreacted reactant(s) through the polymerisation zone in said reactor in the presence of a polymerisation catalyst under reactive conditions, characterised in that the said controlling process consists in controlling the particle size distribution SPAN of the polymerisation catalyst or its support.

It is a preferred embodiment of the present invention to achieve the above control process in order to achieve a constant density of the polymer particles produced.

It is a further embodiment of the present invention to achieve the above control process in order to achieve a constant melt index of the polymer particles produced.

The present invention also relates to a continuous gas-phase (co-)polymerisation of olefins in a fluidised bed reactor in the presence of a polymerisation catalyst wherein the density of the polymer powder particle leaving the reactor is maintained constant by controlling the particle size distribution of the polymerisation catalyst or its support.

The present invention further relates to a process for controlling the particle size distribution of a polymerisation catalyst in order to achieve the production of a polymer powder particle of constant density during the continuous gas-phase (co-)polymerisation of olefins in a fluidised bed reactor.

For the purposes of the present invention and appended claims, a constant density of the polymer powder particles produced means that more than 99% of the particles,
preferably more than 99.5% of the particles,
more preferably more than 99.9% of the particles, have densities comprised in the range of plus or minus 2.5 g/cm3,
preferably plus or minus 2 g/cm3 around the average density of the polymer powder particles forming the bed.

Said density can be measured according to ISO 1872/1-1993.

For the purposes of the present invention and appended claims, the particle size distribution SPAN of the polymerisation catalyst means the ratio of the difference between the diameter corresponding to 90% of the total distribution and the diameter corresponding to 10% of the total distribution to the average diameter of the distribution.

$$SPAN=(D_{90}-D_{10})/D_{50}$$

Said SPAN can be measured according to ISO 9276-1.

According to a preferred embodiment of the present invention, the SPAN is below 1.6, preferably below 1.5, more preferably below 1.4.

For the purposes of the present invention and appended claims, the polymerisation zone means the reaction zone consisting of the fluidised bed (where most of the solids are typically well mixed), and (if any) in the region above the fluidised bed which consists of the powder disengagement zone and/or the velocity reduction zone (where the solids can, typically, be less well mixed).

The hot recycle stream withdrawn from the reactor comprises unreacted gaseous (co)monomers, and optionally, inert hydrocarbons, inert gases such as nitrogen, reaction activators or moderators such as hydrogen, as well as entrained catalyst and/or polymer particles.

The cooled recycled stream fed to the reactor additionally comprises make-up reactants (gaseous or liquid) to replace those reactants polymerised in the polymerisation zone.

The process according to the present invention is particularly suitable for the manufacture of polymers in a continuous gas fluidised bed process. Illustrative of the polymers which can be produced in accordance with the invention are the following:

SBR (polymer of butadiene copolymerised with styrene),
ABS (polymer of acrylonitrile, butadiene and styrene),
nitrile (polymer of butadiene copolymerised with acrylonitrile),
butyl (polymer of isobutylene copolymerised with isoprene),
EPR (polymer of ethylene with propylene),
EPDM (polymer of ethylene copolymerised with propylene and a diene such as hexadiene, dicyclopentadiene or ethylidene norborene),
copolymer of ethylene and vinyltrimethoxy silane, copolymer of ethylene and one or more of acrylonitrile, maleic acid esters, vinyl acetate, acrylic and methacrylic acid esters and the like In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more $C_4$–$C_8$ alpha-olefins. The preferred alpha-olefins are but-1-ene, pent-1-ene, hex-1-ene, 4-methylpentyl-1-ene (4MP-1), oct-1-ene and butadiene. Examples of higher olefins that can be copolymerised with the primary ethylene and/or propylene monomer, or as partial replacement for the $C_4$–$C_8$ monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4MP-1.

The process according to the present invention may be used to prepare a wide variety of polymer products for example polypropylene, linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

The process according to the present invention is especially useful for the preparation of copolymers of ethylene showing a density comprised between 0.880 and 0.925 g/cm3.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as $C_4$–$C_8$ alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75–100° C. and for HDPE the temperature is typically 80–115° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. The process is also suitable for use with Ziegler catalysts supported on silica. The process is also especially suitable for use with metallocene catalysts in view of the particular affinity and reactivity experienced with comonomers and hydrogen. The process can also be advantageously applied with the iron and/or cobalt complexes catalysts, e.g. such as those disclosed in WO98/27124 or in WO99/12981. It is also possible to use a high-activity catalyst consisting essentially of a chromium oxide activated by a heat treatment and associated with a granular support based on a refractory oxide.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

Catalysts that may also be suitably employed in the present invention are unsupported liquid catalysts. In this specific embodiment the SPAN is calculated on the basis of the catalyst droplet diameter rather than on the catalyst particle per se.

The man skilled in the art is capable of calculating the density, the melt-index and also the sintering temperature of polymer that will be produced from a known catalyst system and reaction conditions.

The presence in the final product of even small quantities of material which is of significantly different properties from that desired can have unacceptable impact on the operation of the process. For example polymerisation with metallocene catalysts can create a fraction of the polymer particles whose density is less than 0.98 times that of the average density of the polymer.

A further benefit of the present invention is to improve the speed and safety associated with start-ups and grade transitions. When changing grades, the compositions of monomers and hydrogen and the product properties may be changing continuously, the quantity of absorption of monomers in the polymer will additionally be altered by the changing product properties (principally density) and gas composition. The control of the SPAN within tight predetermined limits enables the speed of start-ups and transitions to be improved and the production of wide-specification material to be minimised.

The following Examples will now illustrate the present invention.

COMPARATIVE EXAMPLE 1

The process is carried out in a fluidised bed gas phase polymerisation reactor consisting of a vertical cylinder of diameter 0.75 m and height 5 m and surmounted by a velocity reduction chamber. In its lower part, the reactor is equipped with a fluidisation grid and an external line for recycling gas, connecting the top of the velocity reduction chamber to the lower part of the reactor, situated under the fluidisation grid. The gas recycling line is equipped with a compressor and with a heat transfer means. Opening into the gas recycling line there are, in particular, the feed lines for ethylene, 1-butene, hydrogen and nitrogen, which represent the main constituents of the gas reaction mixture passing through the fluidised bed.

Above the fluidisation grid the reactor contains a fluidised bed consisting of a linear low density polyethylene powder. The gas reaction mixture, which contains ethylene (1.2 MPa), 1-hexene (0.0048 MPa), hydrogen (0.00348 MPa), pentane (0.2 Mpa) and nitrogen and other minor components passes through the fluidised bed at a pressure of 2.4 MPa, at 80° C. and with an upward fluidisation velocity of 0.4 m/s.

The polymerisation reactor is fitted with three sets of wall temperature indicators at 0.5 m, 1.0 m and 1.5 m above the fluidisation grid.

The catalyst used is a raetallocene catalyst prepared according to Example 17 of WO98/27119. The particle size distribution of the support is characterised by a SPAN above 1.6

Catalyst is injected at a rate of 40 g/h. Under these conditions (80° C., 2.4 MPa, 0.4 m/s) a linear low density polyethylene with a density of 0.918, a melt index of 1.3 g/10 minutes under a 2.16-kg load at 190° C. is manufactured at an output which stabilizes at 120 kg/h, one day after the start of the reaction. It is noticed that it is necessary to increase hexene to ethylene feedrate ratio to 0.14 Kg of hexene per Kg of ethylene to get the product in the above specification. 36 hours after initial reaction small agglomerates begin to appear: their shape is irregular, a few cm in diameter. They are constituted by sintered powder and their composition is very different to that of the bed: their density is 0.914, a melt index of 0.5 g/10 minutes under a 2.16-kg load at 190° C. As the run progresses the quantity of agglomerates increases to a level such that the product removal is blocked. The increase of agglomerates is shown by the fact that the amount of coarse particles above 1600$\mu$ increases beyond 25% in weight. Finally the run is stopped by a defluidisation of the bed caused by the accumulation of agglomerates on the grid. The reactor shutdown is necessary to remove the large agglomerates deposited on the grid.

The analysis of the powder shows 7 percent fractions under 300$\mu$ whose density is 0.91.

EXAMPLE 2

Example 1 was repeated except that the particle size distribution of the support is characterised by a SPAN below 1.4

Catalyst is injected at a rate of 80 g/h. Under these conditions (80° C., 2.4 MPa, 0.4 m/s) a linear low density polyethylene with a density of 0.918, a melt index of 1.3 g/10 minutes under a 2.16-kg load at 190° C. is manufactured at an output which stabilizes at 250 kg/h, one day and a half after the start of the reaction. It is noticed that the hexene to ethylene feedrate ratio required to get the product in the above specification is only 0.115 Kg of hexene per Kg of ethylene. The process operation is very smooth without any agglomerates. The powder analysis shows that the fraction of powder under 300$\mu$ is less than 3% and that its density is above 0.916. The coarse particle fraction above 1600$\mu$ is less than 2% in weight.

What is claimed is:

1. Process for controlling the density of polymer powder particles leaving a reactor, comprising forming polymer powder particles in an olefin(s) continuous gas-phase (co-) polymerisation process in a single fluidised bed reactor having a polymerization zone, withdrawing from the reactor a hot recycle stream comprising a principal monomer and at least another unreacted reactant, cooling part or all of said recycle stream withdrawn from said reactor, and recycling part or all of said cooled recycle stream comprising the principal monomer and the unreacted reactant(s) through the polymerisation zone in said reactor in the presence of a polymerisation catalyst under reactive conditions, wherein the density of the polymer powder particles is maintained constant by controlling the particle size distribution SPAN of the polymerisation catalyst.

2. Process according to claim 1 wherein more than 99% of the polymer powder particles leaving the reactor have densities in an interval of plus to minus 2.5 g/cm$^3$ around the average density of the polymer powder particles forming the bed.

3. Process according to claim 1 or 2 wherein the SPAN is maintained below 1.6.

4. Process according to claim 1 wherein the principal monomer is ethylene or propylene.

5. Processing according to claim 4 wherein the principal monomer is ethylene.

6. Process according to claim 5 wherein the polymer produced is a copolymer of ethylene having a density between 0.880 and 0.925 g/cm$^3$.

7. Process according to claim 1 wherein the polymerisation catalyst is a metallocene or a Phillips chromium catalyst.

8. Process according to claim 7 wherein the polymerisation catalyst is a metallocene.

9. Process according to claim 3 wherein the SPAN is maintained below 1.5.

10. Process according to claim 9 wherein the SPAN is maintained below 1.4.

11. Process according to claim 1 wherein the polymerisation catalyst is a supported polymerisation catalyst and the density is maintained by controlling the particle size distribution SPAN of the polymerization catalyst's support.

* * * * *